Aug. 19, 1941.   J. W. DAWSON   2,253,365
CONTROL SYSTEM
Filed Nov. 26, 1938
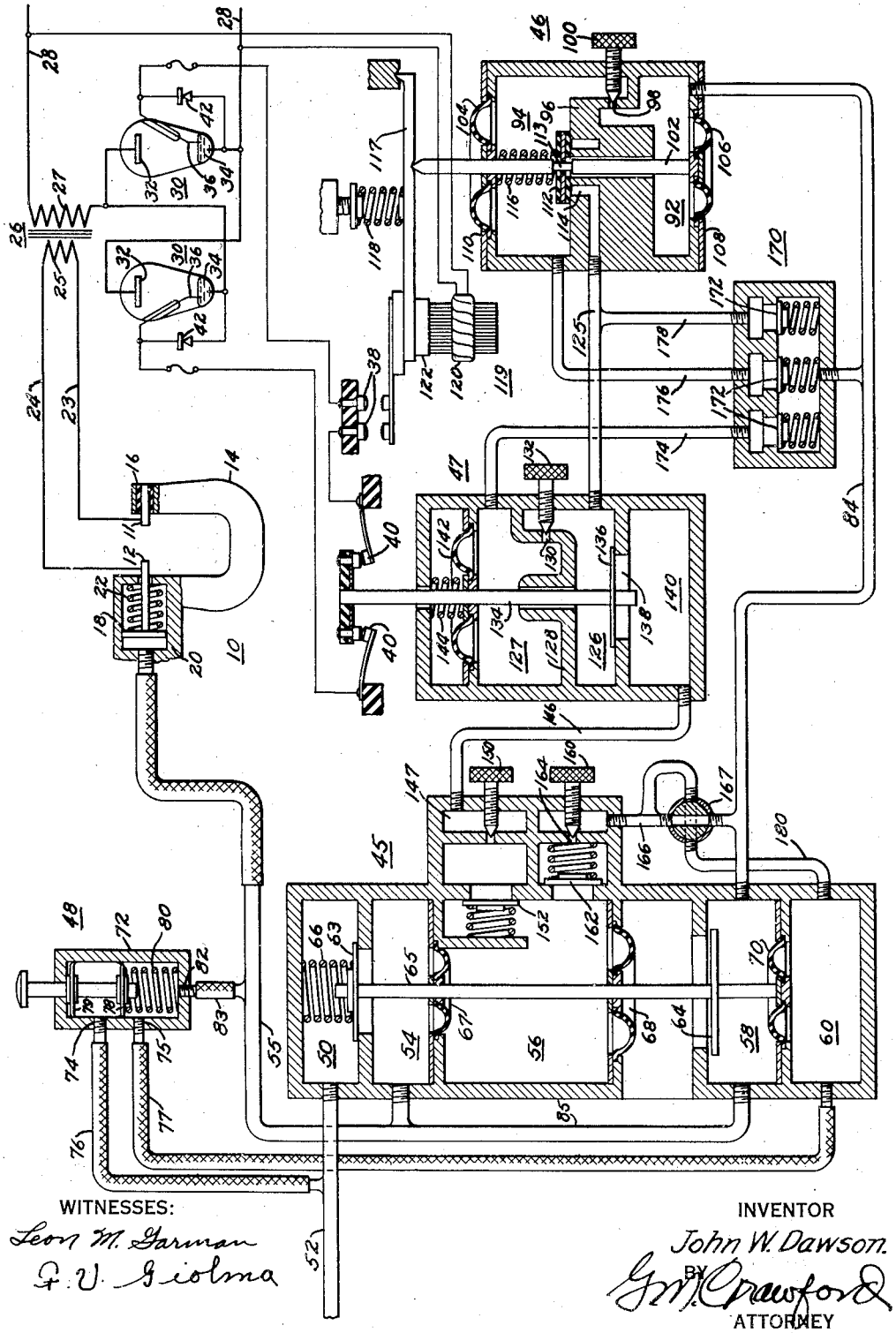
WITNESSES:
Leon M. Garman
G. V. Giolma
INVENTOR
John W. Dawson.
BY
G. M. Crawford
ATTORNEY Patented Aug. 19, 1941

2,253,365

UNITED STATES PATENT OFFICE 2,253,365

CONTROL SYSTEM

John W. Dawson, Auburndale, Mass., assignor to Westinghouse Electric & Manufacturing Company, East Pittsburgh, Pa., a corporation of Pennsylvania Application November 26, 1938, Serial No. 242,533

9 Claims. (Cl. 219—4)

My invention relates, generally, to control systems, and, in particular, to control systems and apparatus for spot or resistance welders.

It is generally an object of my invention to provide for controlling a plurality of steps in a spot or resistance welding operation in a simple and effective manner.

More specifically, it is an object of my invention to provide for the control of fluid pressure operated spot or resistance welding apparatus so as to perform a plurality of steps in a welding operation in a definite automatic sequence.

Another object of my invention is to provide for effecting either a single cycle, or a plurality of cycles of steps in a welding operation in rapid sequence, under the control of a fluid pressure actuated control device.

A further object of my invention is to provide for automatically performing a plurality of separate steps in a welding operation in a definite sequence, and also permitting variations in the duration of each step without the possibility of any overlapping between the successive steps.

Still another object of my invention is to provide a sequence control device including a fluid pressure actuated valve member.

A still further object of my invention is to provide for controlling automatically the operations of fluid pressure operated spot or resistance welding apparatus by a separate centralized fluid pressure control device which may be readily used with existing spot welding apparatus, and is simple and effective in its operation.

Other objects will, in part, be obvious, and will, in part, appear hereinafter.

In practicing a preferred embodiment of my invention, fluid pressure operated control means, comprising preferably a plurality of related pressure chambers and fluid pressure actuated valve members, may be utilized in connection with a source of fluid pressure for automatically controlling in a definite sequence the admission of pressure fluid to the electrode actuating means of spot or resistance welding apparatus, the connection of the electrodes to a source of welding current at the expiration of a predetermined variable pre-weld period, the disconnection therefrom after the lapse of a predetermined variable weld period, the release of the pressure fluid from the electrode actuating means upon the termination of a predetermined chill period and the prevention of the reapplication of fluid pressure to the electrode actuating mechanism until the termination of a predetermined variable delay period. For example, the control means may comprise a plurality of elements or units, each for controlling a different step in the welding operation, and by so connecting the different elements or units that the passage of pressure fluid from one element or unit to the next must be effected before the succeeding operation may be initiated, and providing metering means between the successive chambers in the units for controlling the rate of flow of pressure fluid between the chambers in a unit, the rate of increase of fluid pressure in the succeeding chamber may be controlled, and the welding operations can be performed only in a predetermined sequence, while still allowing a wide range of variation in the duration of each step in the sequence. By providing each element or unit with suitable valve members for controlling the passage of pressure fluid from one element or unit to the next, so that it cannot take place until the termination of the function being controlled by the previous element or unit, a change in the duration of the operation controlled by any one element or unit will have substantially no effect upon the duration of the operation performed by any other element or unit, and the duration of the functions controlled by the different elements or units may be separately varied at will.

For a more complete understanding of the nature and scope of my invention, reference may be had to the following detailed description, taken in connection with the accompanying drawing, in which the single figure represents schematically a spot welding system embodying a preferred form of my invention.

Referring to the accompanying drawing, the reference numeral 10 denotes generally a spot welding machine of any well known type, herein shown in the form of a portable gun welder comprising a pair of relatively movable electrodes 11 and 12, supported in a substantially C-shaped frame 14. The electrodes may be insulated from each other in any desirable manner, the electrode 11 being, for example, mounted rigidly in the frame 14 and insulated therefrom by an insulating bushing 16. The electrode 12 is preferably supported in the frame 14 so as to be movable relative to the fixed electrode 11, and may be operatively connected to a piston 18, slidably positioned within a cylinder portion 20 of the frame, to which fluid pressure may be admitted for actuating the electrode 12 to engage work positioned between the electrodes. Although as shown, the piston 18 is actuable only in one direction by fluid pressure, and a spring 22 is provided for normally maintaining the movable electrode 12 in the retracted position, it will be readily understood that there are numerous other types of welding guns well known in the art, wherein the movable electrode is disposed to be actuated in both directions by means of fluid pressure, and my invention may be readily adapted for use in connection therewith and its use is not intended to be limited to the exact form shown.

In order to supply welding current to the electrodes, they may be respectively connected by suitable conductors 23 and 24 to the secondary winding 25 of a transformer 26, the primary winding 27 of which may be connected to a suitable source of alternating current power 28. Switch means, such as the arc-discharge devices or Ignitron valves 30, which are shown connected in a well known manner, in inverse parallel relation in series circuit relation with the primary winding 27, may be provided for controlling the connection of the winding 27 to the source 28. By connecting the anode 32 of each Ignitron valve to the cathode 34 of the other, and connecting the igniter 36 of each valve in series circuit relation with normally open control contact members 38 and normally closed control contact members 40, and providing a shunt circuit connection of a unidirectional current device 42 between the igniter 36 of each valve and the cathode 34 thereof, the conductivity of the Ignitron valves may be readily controlled by the operation of the control contact members 38 and 40, thus controlling the supply of welding current to the electrodes.

In order to facilitate the description of the fluid pressure control means utilized in my invention for controlling the sequence and duration of the different steps of a welding operation, namely the application of fluid pressure to the electrode actuating means 18, the connection of the electrodes to the source, the disconnection of the electrodes from the source, and the release of fluid pressure from the electrode actuating means, the sequence control device is represented in the accompanying drawing as comprising a plurality of separate devices or units, namely, a master relay 45, a switch relay 46, a timing relay 47, and a control valve 48. It is to be understood, however, that these devices are illustrated as separate units merely for the purpose of more clearly describing the nature and their functions in controlling certain steps in the welding operation, and they may be combined in any suitable manner without altering the character thereof, and may comprise for example, an integral unit in the form of a single casing, which may be provided with the respective chambers and passages therebetween, which appear in the accompanying drawing as separate chambers connected by tubing or pipes.

The master relay 45, which is disposed to control the application of fluid pressure to the cylinder 20 of the welding gun 10, may be provided with a plurality of related pressure and valve chambers, comprising, for example, a supply chamber 50 which is disposed to be connected to a suitable source of fluid pressure 52, an adjacent inlet chamber 54 connected by a pipe or supply line 55 to the cylinder 20 of the electrode actuating means, a chill chamber 56, an exhaust chamber 58, and an initiating chamber 60, the purposes of which will hereinafter be explained in detail. An inlet valve 63 for controlling the flow of pressure fluid from the supply chamber 50 to the inlet chamber 54, and an exhaust valve 64 for controlling the flow of pressure fluid from the exhaust chamber 58 to the atmosphere, may be provided with a common stem 65 and normally biased by a spring 66 to maintain the inlet valve 63 in the closed position and the exhaust valve 64 in the open position.

The common valve stem 65 is preferably supported by flexible diaphragm members 67, 68 and 70 which are positioned in any suitable manner in the partitions at the upper and lower ends of the chill chamber 56, and between the exhaust chamber 58 and the initiating chamber 60, respectively. By suitably determining the ratios of the respective areas of these valve supporting diaphragms, differentials in pressure between the various chambers of the master relay can be utilized for actuating the valve stem 65 and its associated valve members to control the operation of the electrode actuating means and effect operation of the sequence control.

The operation of the master relay 45 may be initiated by the control valve 48 which may comprise a casing 72 having spaced valve ports 74 and 75 in the side wall thereof, connected respectively to the source of fluid pressure 52 and to the initiating chamber 60 of the master relay 45 by suitable connecting means, such as the flexible hoses 76 and 77, thus permitting the control valve and the master relay to be relatively movable if desired.

A slidable valve, comprising a pair of spaced apart valve members 78 and 79 is positioned within the control valve casing 72 and biased by a spring 80 in such a manner that in the normal off position, the valve member 78 is positioned between the valve ports 74 and 75 to prevent the flow of pressure fluid therebetween. Upon actuation, the valve member 78 is moved past the port 75, connecting the ports 74 and 75 so that fluid pressure will be admitted to the initiating chamber 60 of the master relay 45 through the connecting hose 77. Thereupon the diaphragm member 70 is urged upwards when the pressure thereon exceeds the downward pressures on the diaphragm 68 and the valve 63. The valve 63 opens, reducing greatly the downward pressure thereon, and effecting a rapid acceleration of the valve stem 65. Fluid pressure is admitted to the inlet chamber 54, through the pipe or supply line 55 to the cylinder 20 of the welding gun. An additional port 82 may be provided in the lower end of the control valve casing and connected by a flexible hose 83 with the supply line 55 which transmits fluid pressure from the inlet chamber 54 to the cylinder 20 of the welding gun 10, so that upon the transmission of fluid pressure to the welding gun, fluid pressure will be also applied to the lower side of the valve member 78 to aid the return thereof to its normal closed position, thus facilitating the performance of a single sequence of welding operations. By providing flexible hoses 76, 77 and 83 in connection with the control valve 48, it is possible to mount the control valve 48 and the master relay 45 separately, if it is so desired. Likewise, the fluid pressure supply line or pipe 55 may be flexible if it is desired to render the welding gun 10 readily portable.

To effect the connection of the electrodes 11 and 12 to the source 28 of welding current in timed relation with the application of fluid pressure to the electrode actuating means, the switch relay 46 may be connected by means of a conduit 84 to the exhaust chamber 58 of the master relay 45. Upon actuation of the valve member 63 to transmit fluid pressure to the welding gun, the exhaust valve 64 closes, and through conduit 85, pressure chamber 58 and conduit 84, fluid pressure is admitted to the chamber 92 of the switch relay 46. The switch relay 46 may, as shown, comprise generally a pair of adjacent pressure chambers 92 and 94, separated by a partition 96 having a fluid pressure port 98 with an associated needle valve 100 for metering the rate of flow of pressure fluid therethrough. A movable stem 102 may be resiliently supported by flexible diaphragm members 104 and 106 which are respectively secured to the outer end of the pressure chambers 92 and 94, they being, for example, clamped thereto by clamping rings 108 and 110, respectively, so as to effectively seal the outer ends of these chambers, while permitting longitudinal movement of the stem 102. An auxiliary valve member 112 may be operatively connected with the stem 102, being for example slidably positioned upon a portion 113 thereof of reduced cross section, and biased by a spring 116 for normally sealing an annular valve port 114, through which the pressure in the chamber 94 is relieved, upon actuation of the stem. By thus positioning the valve 112, the stem 102 may commence to move without having to first overcome the pressure on the valve 112, thus facilitating the operation of the stem in timed relation with the current pulsations of the source, as will be hereinafter explained in detail.

By properly proportioning the relative areas of the diaphragm members 104 and 106, it is possible to provide for actuation of the stem 102 in the upward direction as indicated in the drawing, when a predetermined pressure has built up in the chamber 94, sufficient to overcome the pressure exerted against the diaphragm 106, and by adjustment of the needle valve 100, the time required for this operating pressure to be reached may be varied over a wide range without being appreciably affected by variations in pressure at the fluid pressure source, since the operation of the stem is effected by the difference in the pressures exerted against the diaphragms 104 and 106 and not simply by the application of pressure upon a single actuating member.

The control contact members 38 may be actuated by the switch relay 46 in any suitable manner, such as, for example, by operatively connecting the stem 102 thereof with a contact arm 117 which supports the contact members 38, for urging it against the biasing force of an adjustable spring member 118 which normally retains the contact members in the open position. An alternating current magnet 119, the operating coil 120 of which is connected with the source 28, may be provided for exerting a resisting magnetic pull on the armature 122 of the contact arm 117, so that closure of the contact members 38 may be effected in timed relation with the current pulsations of the source 28 at substantially a predetermined interval of time after the application of fluid pressure to the welding gun, to effect the energization of the igniters 36 of the Ignitron valves 30. By thus rendering the Ignitron valves conductive, welding current is supplied to the electrodes in timed relation with the current pulsations of the alternating current source 28.

In order to control the duration of the flow of welding current, a conduit 125 may be provided for connecting the annular port 114 of the switch relay 46 to the timing relay 47, so that the timing relay 47 may be energized for operation in a definite sequence relative to the operation of the switch relay 46. As indicated, the timing relay 47 may comprise a valve chamber 126 and an associated pressure chamber 127 separated by a partition 128 having a relief port 130 with an adjustable needle valve 132 associated therewith for metering the rate of flow of the pressure fluid therethrough, and thus controlling the rate at which pressure is built up in the chamber 127.

A movable stem 134 may be provided with an associated valve member 136 thereon, normally adapted to seal an exhaust port 138 between the pressure chamber 126 and an exhaust chamber 140. By providing a resilient diaphragm actuating member 142 for supporting and actuating the valve stem 134 and at the same time effectively sealing the upper end of the pressure chamber 127, the valve member 136 may be actuated when the pressure on the lower side of the diaphragm 142 exceeds the pressure on the upper side of the valve 136 and that exerted by the spring 144. Since operation of the valve stem 134 is opposed both by the fluid pressure on the upper surface of the valve 136 and by the force exerted by the spring 144, it is not directly dependent on the value of the fluid pressure applied, and the effects of variations in the value of the fluid pressure are minimized, so that the duration of the weld period is not appreciably affected thereby.

In this manner the control contact members 40, which are operatively connected with the valve stem 134, so as to be actuated thereby, and are normally retained in the closed position by the spring member 144, may be opened upon actuation of the valve stem 134. Since the time required for the actuation of the valve stem 134 after the admission of fluid pressure to the valve chamber 126 of the timing relay is governed by the interval of time required for the necessary fluid pressure to build up in the chamber 127, and the rate of admission of pressure fluid to the chamber 127 of the timing relay upon operation of the switch relay 46 to effect energization of the welding circuit is controlled by adjustment of the needle valve 132, the duration of the application of welding current to the electrode members may be readily controlled by adjustment thereof.

Since it is generally desirable to maintain the electrode members 11 and 12 in engagement with the work for a predetermined interval of time after the cessation of the flow of welding current, so as to effect a chilling of the weld metal, the exhaust chamber 140 of the timing relay 47 may be connected by a conduit 146 with the master relay 45 to permit the discharge of pressure fluid from the valve chamber 126 through the valve port 138, into the exhaust chamber 140, through the conduit 146, and into an auxiliary chamber 147 which is connected with the chill chamber 56 of the master relay 45 through a needle valve 150 and a check valve 152. As the valve stem 65 of the master relay 45 maintains the inlet valve 63 in the open position because of an excess of the sum of the upward pressures exerted on the lower sides of diaphragm members 67 and 70 and the closed valve 64 over the sum of the opposing pressures downward on the upper sides of the diaphragms 67, 68 and 70, it may be seen that by properly proportioning the dimensions of diaphragm members 67 and 68, which are positioned in the partitions at either end of the chill chamber 56, and by controlling the fluid pressure therein, it is possible to provide a differential pressure for overcoming the pressure exerted on the lower side of the diaphragm member 70. The valve stem 65 may thus be actuated to close the inlet valve 63 and open the exhaust valve 64, thus disconnecting the cylinder 20 of the electrode actuating means from the source of fluid pressure 52, and connecting it to the exhaust chamber 58 of the master relay 45, so as to effect a reduction of the pressure in the cylinder 20 and effect disengagement of the electrode members from the work.

In order to provide a predetermined interval of time between the termination of one sequence of welding operations and the commencement of a subsequent sequence of welding operations, a needle valve 160 may be provided for metering the rate of exhaust of the pressure fluid from the chill chamber 56, through the check valve 162, valve port 164, conduit 166 and thence by means of a suitable valve 167 to either the exhaust chamber 58, or the initiating chamber 60, depending on whether repeat or single spot or resistance welding operations are desired. By controlling the rate of flow of pressure fluid through the valve 160, the rate of decrease in pressure in the chill chamber 56 may be controlled and the actuation of the valve stem 65 to open the inlet valve 63 and again admit pressure to the cylinder 20 of the welding gun may be delayed for a predetermined interval, even though the control valve 48 is operated to again admit pressure to the chamber 60.

In order to provide for the reduction of pressure in the chambers of the switch relay 46 and the timing relay 47 between successive sequences of operations, so as to maintain a predetermined timing of the steps in the welding operation controlled by each device, regardless of whether a single sequence of operations or a plurality of sequences are being performed, a suitable pressure relief device 170 may be utilized. This device may comprise a plurality of spring biased check valves 172, respectively connected by conduits 176, 178 and 174 with the annular port 114 of the switch relay 46, and with the chambers 126 and 127 of the timing relay 47, so as to provide one-way pressure relief passages therefrom connecting with the exhaust chamber 58 of the master relay 45 so as to positively provide for the reduction of the pressure in these chambers when the valve stem 65 operates to open the exhaust valve 64 at the termination of a welding sequence. If desired, the relief device 170 could readily be combined with the master relay 45, the conduits 174, 176 and 178 being so associated therewith that the exhaust valve 64, when closed, seals the conduits, and when open, provides a passage from the chambers 84, 126 and 127 to the air, thus effectively reducing the pressures therein.

The operating sequence of the preferred form of the control system illustrated is as follows: The valve 167 is positioned as shown in full lines, to connect the chill chamber 56 to the exhaust chamber 58, and the control valve 48 may then be actuated to admit fluid pressure to the initiating chamber 60 through the conduit 77, whereupon the valve stem 65 is actuated by the pressure on diaphragm 70 to open the inlet valve 63 and close the exhaust valve 64. Pressure fluid is admitted through the inlet chamber 54 and thence by the supply line or pipe 55 to the cylinder 20 of the welding gun to actuate the movable electrode member 12. At the same time, it is admitted by way of the now closed exhaust chamber 53 of the master relay 45 and the conduit 84 to the switch relay 46. After the lapse of a preweld period, determined by the setting of the needle valve 100, the switch relay 46 operates and the contact members 38 are actuated in synchronism with the current pulsations of the source, connecting the igniters 36 to the source 28 and thus energizing the welding electrodes. Upon actuation of stem 102 of the switch relay 46, the auxiliary valve 112 opens to admit pressure fluid to the timing relay 47, and after a predetermined weld period the timing relay 47 operates to open the normally-closed contact members 49, rendering the ignitron valves 30 non-conductive, and effecting deenergization of the welding electrodes. Pressure may be maintained upon the electrodes until the pressure in the chill chamber 56 of the master relay increases sufficiently to overcome the pressure on the lower side of the diaphragm 70. By adjusting the valve 160, the time for the pressure to build up in the chamber 56 may be varied and the operation of the valve stem 65 to open the exhaust valve 64 may be controlled as desired. Until the pressure in the chill chamber 56 is subsequently reduced by the flow of pressure fluid therefrom by way of the valve port 164, the conduit 166 and valve 167, to the exhaust chamber 58, the exhaust valve 64 must remain in the open or exhaust position, since the net effect of pressure in the chill chamber 56 results in a downward component acting on the valve stem which opposes the upward pressure on the diaphragm 70. Then, if the control valve 48 is again depressed, or has remained depressed, the entire welding sequence may be automatically repeated.

If but a single complete sequence of welding operations is desired, the control valve 48 may be merely momentarily depressed, and upon the admission of pressure fluid to the welding gun, fluid pressure will be applied to the lower side of the control valve member 72 through the conduit 83, to effect its return to the closed position, so that but a single sequence of operation follows. By operating the valve 167 to the position shown in dotted lines, and connecting the chill chamber 56 through conduit 166, valve 167 and conduit 180, to the initiating chamber 60, line pressure may be applied to the pressure port 164, as long as the control valve 48 is maintained in the operative position, and the reduction of fluid pressure in the chill chamber 56 prevented, thus providing for an indefinitely long delay period. By thus providing for the connection of the conduit 166 to either the exhaust chamber 58 or the initiating chamber 60, dependent upon the position of the valve 167, either "repeat" or single welding operations may be performed without requiring the operator to do more than hold the control valve in the operating position.

Thus it will be seen that a single complete sequence or a plurality of successive sequences of welding operations may readily be automatically performed. The duration of each step in a sequence may be readily varied without any possibility of overlap in the successive steps, thus eliminating the hazard of relieving electrode pressure with the welding electrodes still energized, or commencing a subsequent welding operation before the completion of a previous one.

Since certain changes may be made in the above description and different embodiments of the invention may be made without departing from the spirit thereof, it is intended that all the matter contained in the above description or disclosed in the accompanying drawing shall be considered as illustrative and not in a limiting sense.

I claim as my invention:

1. The combination with spot welding apparatus having a pair of electrode members, fluid pressure means for effecting relative movement of the electrode members to engage work, of fluid pressure actuated switch means for controlling the energization of the electrode members from a source of alternating current, control means energized from the source operatively connected to the switch means to secure operation thereof in synchronism with the current from the source, timing means operable under the control of said switch means for effecting deenergization of the electrode members a predetermined variable interval of time after energization, fluid pressure operated means for controlling the application of fluid pressure to the electrode actuating means and the switch means, and metering means associated with the fluid pressure operated means for controlling operation of said means to effect operation of the electrode members to release the work a predetermined interval of time after the electrode members are deenergized.

2. The combination with spot welding apparatus having a pair of relatively movable electrode members, fluid pressure means for actuating the electrode members to engage work, of a control device including synchronously operable fluid pressure actuated switch means for effecting the connection of the electrode members to a source of alternating current, timing means associated with the switch means for disconnecting the electrode members from the source after connection thereto for a predetermined variable interval of time, relay means for controlling the connection of the actuating means of the electrode members and of the switch means to a source of fluid pressure, fluid pressure valve means connected between the relay means and the timing means for controlling operation of the relay means to effect actuation of the electrode members to disengage the work at a predetermined interval of time after disconnection of the electrode members from the source, and additional means associated with the relay means for preventing subsequent operation thereof for a predetermined interval of time.

3. A spot welding sequence control system for welding apparatus having a pair of relatively movable electrode members, fluid pressure actuated means for effecting relative movement of the electrode members to engage work and apply pressure thereto, and main switch means operable to effect the energization of the electrode members from a source of alternating current for supplying welding current to the electrode members, comprising fluid pressure operated control switch means for effecting the operation of the main switch means at a predetermined interval of time after actuation of the electrode members to engage the work, means associated with the source of alternating current for preventing operation of the control switch means until a predetermined point in the current cycle, fluid pressure operated timing means connected in series relation with the control switch operating means for controlling the duration of operation of the main switch means, fluid pressure actuated relay means for automatically controlling the application of fluid pressure to the electrode member actuating means to effect operation thereof to engage the work and to the control switch operating means, metering means associated with the relay means for controlling the duration of the period of engagement of the electrode members with the work, and control means for selectively controlling the application of fluid pressure to the relay means to effect the initiation of a welding sequence.

4. The combination with a spot welding machine which includes a pair of relatively movable electrode members for engaging work, fluid pressure actuating means for effecting relative movement of the electrode members, and a source of alternating current, of welding sequence control means including fluid pressure operated relay means for automatically controlling the operation of the electrode actuating means to effect engagement and disengagement of the electrode members with the work, fluid pressure operated switch means controlled by the relay means for effecting energization of the electrode members from the source, control means connected with the source for preventing operation of the switch means until a predetermined point in the current cycle, fluid pressure actuated timing means for effecting deenergization of the electrode members after a predetermined period of energization, fluid pressure means connecting the timing means and the relay means for controlling the operation of the relay means to prevent disengagement of the electrode members from the work until a predetermined interval of time after deenergization of the electrode members, metering means associated with the relay means for preventing a subsequent operation thereof until the lapse of a predetermined interval of time, and fluid pressure control means for applying fluid pressure to the relay means for initiating an operation of the relay means.

5. Control apparatus for a spot welding system which includes a pair of relatively movable electrode members, fluid pressure actuating means for providing relative movement of the electrode members to engage and disengage work upon which a welding operation is to be performed, and a source of alternating current for supplying welding current to the electrode members, comprising, fluid pressure actuated switch means for effecting connection of the electrode members to the source, restraining means energized from the source operatively connected to restrain actuation of the said switch means until a predetermined point in the current wave, timing means actuated by fluid pressure from the switch means for effecting disconnection of the electrode members from the source after a predetermined period of connection thereto, fluid pressure actuated relay means including a plurality of chambers having a common valve member actuated by fluid pressure connected for controlling the application of fluid pressure to the switch means and fluid pressure actuating means, and means connecting the timing means and relay means for effecting a predetermined timed sequence of operations thereof to terminate a welding operation, and control means actuable to initiate a sequence of operations of the aforesaid means.

6. The combination with a power system including a reactive load circuit, a source of alternating current, a gaseous discharge line switch operable to connect the load circuit to the source, and a source of fluid pressure, of fluid pressure operated switch means for effecting operation of the line switch to connect the load circuit to the source, electromagnetic means energized from the source of alternating current operatively connected with the fluid pressure operated switch means for preventing the operation thereof until a predetermined point in the current wave, and fluid pressure actuated timing means for effecting operation of the line switch to disconnect the load circuit from the source at a predetermined point in the current wave a predetermined variable interval of time after connection thereto.

7. Control means for controlling in a definite sequence the operations of spot welding apparatus including a pair of relatively movable electrode members, fluid pressure electrode actuating means, a source of fluid pressure, a source of alternating current power, and switch means for connecting the welding electrode members to the alternating current source, comprising, fluid pressure actuated relay means having a plurality of pressure chambers and a common valve member supported therein by valve actuating diaphragm members operable to control the connection of the electrode actuating means to, and the disconnection thereof from the source of fluid pressure, a control valve for connecting the relay means to the source of fluid pressure to effect operation of the relay means to connect the electrode actuating means to the source of fluid pressure, a fluid pressure actuated switch connected to one of the pressure chambers of the relay means operable under the control of the relay means to effect energization of the switch means a predetermined variable interval of time after operation of the relay means, means including an electromagnet energized from the alternating current source for restraining the operation of the fluid pressure actuated switch until a predetermined point in the current wave, timing means comprising fluid pressure actuated contact means operable to effect deenergization of the switch means a predetermined interval of time after operation of the fluid pressure actuated switch, means for controlling the rate of pressure fluid flow between the timing means and another of the pressure chambers of the relay means for effecting operation of the relay means to disconnect the electrode actuating means from the source of fluid pressure a predetermined interval of time after disconnection of the electrode members from the alternating current source, and means for controlling the rate of flow of pressure fluid from the relay means to prevent subsequent operation of the relay means before the lapse of a predetermined interval of time.

8. The combination in a power system, of a source of alternating current power, a load, means including a fluid pressure actuated valve member operable to control the connection of the load to the source, and electromagnetic means energized from the source for restraining the operation of the fluid pressure actuated valve member to secure operation thereof in timed relation with the current pulsation of the source.

9. The combination in a power system, of a load disposed to be connected to a source of alternating current power, means including a fluid pressure actuated device operable to effect the connection of the load to the source, and electromagnetic means energized from the source to control the operation of said means to secure the connection of the load to the source in timed relation with the current pulsation of the source.

JOHN W. DAWSON.